Figure 1:
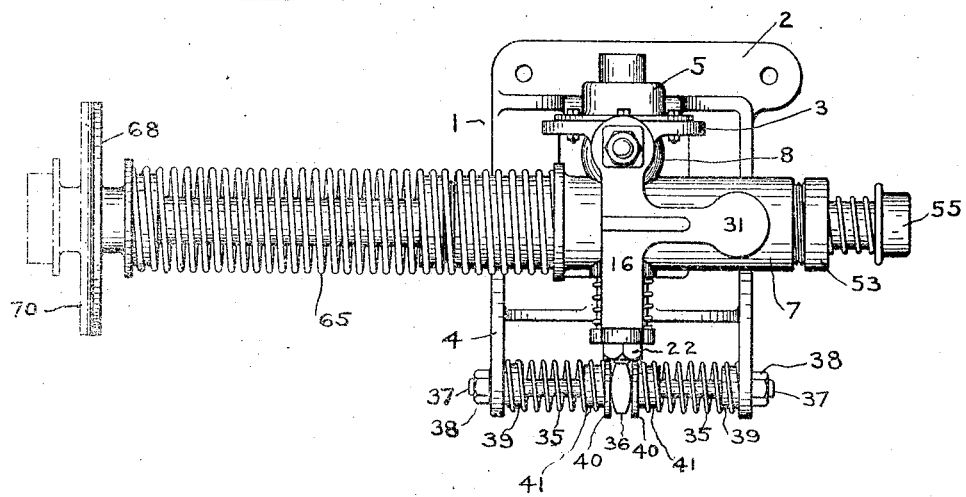

R. GEISER.
AIR COUPLING DEVICE.
APPLICATION FILED AUG. 18, 1913.

1,093,613.

Patented Apr. 21, 1914.
2 SHEETS—SHEET 1.

WITNESSES:

INVENTOR.
Rudolph Geiser,
By Owen & Owen,
His attys.

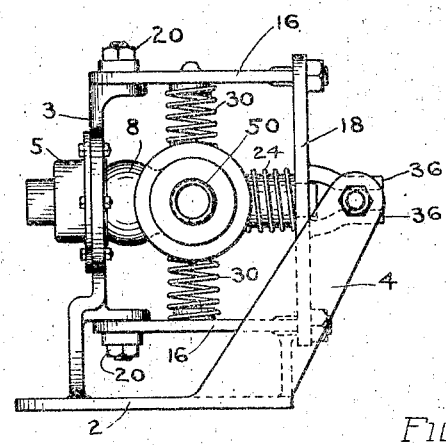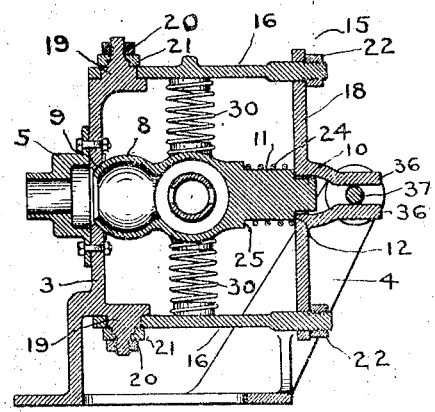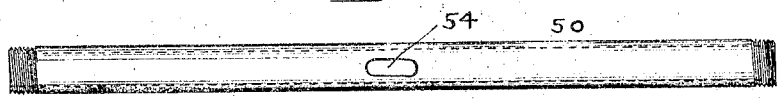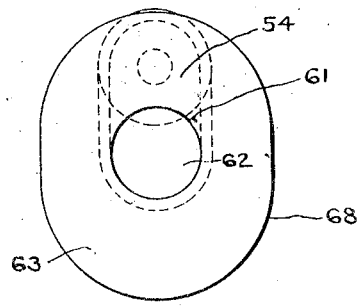

UNITED STATES PATENT OFFICE.

RUDOLPH GEISER, OF TOLEDO, OHIO, ASSIGNOR OF ONE-HALF TO FERDINAND C. HEYER, OF TOLEDO, OHIO.

AIR-COUPLING DEVICE.

1,093,613.   Specification of Letters Patent.   Patented Apr. 21, 1914.

Application filed August 18, 1913. Serial No. 785,305.

*To all whom it may concern:*

Be it known that I, RUDOLPH GEISER, a citizen of the United States, and a resident of Toledo, in the county of Lucas and State of Ohio, have invented a certain new and useful Air-Coupling Device; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to automatic pneumatic couplers.

It is particularly applicable to railway trains wherein the brakes are operated pneumatically. It, however, may be used to provide a means for connecting together pipes which form a connection between an air supply tank or a pump and an operative mechanism, such as a brake. It may be used for connecting pneumatically controlled devices with a central controlling device or with controlling devices. It also may be used for connecting together pipes which convey gases or vapors between two bodies movable with respect to each other.

The invention may be contained in a great many forms of devices as well as used for many purposes. I shall describe hereinafter and show in the drawings one of the many constructions containing the invention. The particular construction shown, I have selected as an example to illustrate how such a structure may be constructed and manipulated and to show that it is operative.

Figure 2:
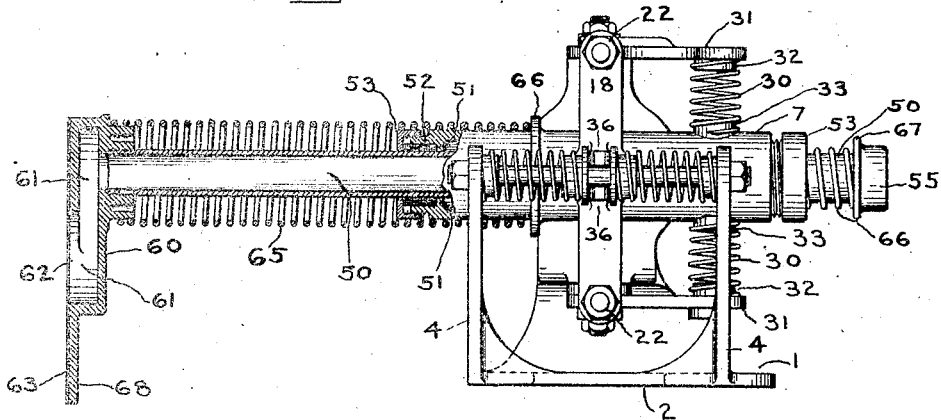

Referring to the drawings, Figure 1 illustrates one view of the structure selected. Fig. 2 illustrates a side view of the construction showing parts in section. Fig. 3 illustrates an end view, one part being removed. Fig. 4 is a vertical sectional view of the construction. Fig. 5 is a view of a connecting pipe, a detail shown in other of the figures, and Fig. 6 illustrates a face view of a contact sealing plate.

1 is a frame which comprises the base 2, the upright supporting plate 3 and the brackets 4. A flanged coupler or connector 5 is secured to the upright 3 and connects the device with the air supply or other system having vacuum capacity or gas or vapor supply. A shell or sleeve 7 is provided with a ball-and-socket joint 8—9 which communicates with the interiors of the flanged coupler 5 and the shell. The shell or sleeve 7 is provided with a bearing 10, which is located on an extending boss or arm 11. This permits the sleeve 7 to rotate about a horizontal axis at right angles to its own axis. The bearing 10 is supported by a rack 15 comprising the horizontal plates 16 and the vertical plate 18. The plates 16 are secured to the outer ends of the vertical plate 18. The rack 15 is pivoted to move about a vertical axis passing through the ball-and-socket joint 8—9 by means of the bearings 19 formed of bosses in the upper and lower ends of the vertical supporting plate 3. The plates 16 are secured in position by means of the nuts 20 and washers 21. The connecting plate 18 bears against the shoulder 12 on the arm or lug 11 and is held in position by means of the nuts 22 located on screws extending from the horizontal plates 16 through the ends of the plate 18. A spring 24 located between the shoulder 25 and the plate 18 keeps the ball 8 seated in its socket 9. This permits the shell to rotate about a vertical axis and prevent leakage at the point of connection.

The shell is held normally horizontally by the springs 30, which are located between one end of the shell 7 and right angular extensions 31 forming parts of the horizontal plates 16 located above and below the shell 7. Bosses or spring seats 32 and 33 are located upon the extensions 31 and on opposite sides of the shell 7. These retain the springs 30 in position.

The shell 7 is normally held centrally and its axis normally maintained parallel with the face of the vertical plate 3 by means of two springs 35, which are located on the opposite sides of two extending lugs or pins 36 secured to or forming a part of the connecting plate 18 located on the rack 15. The pins 36 yoke over or spread a rod 37, which is supported by means of the brackets 4 and is secured in position by means of the nuts 38, and shoulders or collars 39 which also form seats to hold the springs 35 in position. Collars 40 are located between the springs 35 and the pins 36. They are provided with shoulders or bosses 41 which also form seats for the springs 35. The collars 40 are freely movable along the rod 37. As the rack 15 is moved on the bearings 19 one or the other of the springs 35 is more or less compressed, which tends to cause the return of the shell or sleeve to its normal position.

A pipe or tube 50 is located centrally in the shell or sleeve 7 and is movable axially within the sleeve or shell 7. The sleeve or shell 7 is provided with bearings 51, which support the pipe 50 centrally and so as to form a chamber between the outer wall of the pipe 50 and the inner wall of the sleeve 7. Means for suitably packing the bearings is provided and consists of the packing material 52 and the caps 53. The pipe 50 is provided with centrally located ports 54, which permit communication between the interiors of the sleeves 7 and the pipe 50. A cap 55 closes one end of the pipe 50 and a sealing contact plate 60 is secured to the other end of the pipe 50. The sealing contact plate 60 is provided with a passage 61 having an opening or port 62 and communicating with the interior of the sleeve 50. It is also provided with an elastic or sealing or packing material 63 located on the outer surface of the plate. A spring 65 is located between the plate 60 and the shoulder 66 located on the sleeve 7. This tends to force the plate as far as possible outward from the sleeve 7. A buffer spring 66 is located between a flange 67 on the cap 55 and the cap screw 53 which cushions the tube or pipe 50 on its return movements caused by the operation of the spring 65.

The plate 60 is provided with a wide flange 68 surrounding the opening 62. The spring 65 being located centrally with respect to the outer edge of the flange 68 keeps the flange in contact with a corresponding plate 10 supported on the adjacent end of an adjoining car. This is particularly advantageous when the relation of the two cars change either by reason of the change of inclination or curvature of the tracks. The spring 65 pressing the plate 60 centrally causes the plates to remain at all times in sealing contact and causes the coupling mechanism to turn on the axes passing through the ball-and-socket 8—9. This will keep the coupling pipes 50 on adjacent ends of adjoining cars axially in line with each other and consequently prevent any opening at the sides of the plates, which would result in the escape of the air or gas or vapor, or the intake of the air according to the pressure contained within the pipes.

I wish it understood that my invention is not limited to any specific construction or arrangement of the parts except in so far as such limitations are specified in the claims.

Having thus described my invention what I claim as new, and desire to secure by Letters Patent, is,—

1. In an automatic pneumatic coupler, the combination of a cylindrical shell, a ball-and-socket joint communicating with the interior of the shell, a frame, a rack pivoted to the frame, said shell being pivoted in said rack, springs located on opposite sides of the shell for maintaining the shell in a normally horizontal position, springs located on the opposite sides of the rack for maintaining the rack normally with respect to said frame, a pipe communicating with the interior of the shell and movable longitudinally in the shell, a contact plate secured to the outer end of the pipe, and a spring for pressing the plate and pipe outward from the shell.

2. In a car air coupler, the combination of a cylindrical shell, a ball and socket joint located at one side of the shell, a pipe movable in the shell and extending therethrough, a plate having an opening communicating with the pipe and adapted to hold the pipe in position when in contact with a similar plate on an adjoining car.

3. In a car air coupler, the combination of a shell, an oscillating frame for supporting the shell, a pipe located within the shell, a plate connected to the end of the said pipe, the said plate having a central opening communicating with the pipe, the plate depending from the pipe, connection being made above the center of the plate.

4. In a car air coupler, the combination of a cylindrical shell, a hollow ball communicating with the interior of the shell and located on one side thereof, a fixed support having a socket for receiving the said ball, a pivoted frame connected to the said support and having an axis passing through the said ball, the said shell pivotally supported in the frame and support, a pipe movable in the said shell, a plate located at the end of the pipe for keeping the pipe in alinement with a similar pipe on an adjoining car.

5. In a car air coupler, the combination of a shell, a hollow ball communicating with the interior of the shell and located at one side thereof, a fixed support having a socket for receiving the ball, a frame pivotally supported on the fixed support and movable about an axis extending through the center of the ball, the shell pivoted in the said frame and in the said fixed support, a pipe movable in the shell, a plate having an opening communicating with the interior of the pipe and adapted to press against a corresponding plate on an adjoining car whereby the pipes of the two connected cars will be kept in alinement.

In testimony whereof, I have hereunto signed my name to this specification in the presence of two subscribing witnesses.

RUDOLPH GEISER.

Witnesses:
FLORENCE E. AUL,
S. T. KLOTZ.